US009388750B2

(12) United States Patent
Be et al.

(10) Patent No.: US 9,388,750 B2
(45) Date of Patent: Jul. 12, 2016

(54) SYSTEM AND METHOD FOR OPTIMIZING AVAILABILITY OF VEHICLE ENERGY CONSERVING MODES (71) Applicant: Ford Global Technologies, LLC, Dearborn, MI (US)

(72) Inventors: Tuan Anh Be, Livonia, MI (US); Mark Douglas Malone, Canton, MI (US); Kirk Pebley, Novi, MI (US); Hank L. Kwong, Farmington Hills, MI (US); William Najib Mansur, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 387 days.

(21) Appl. No.: 13/832,196

(22) Filed: Mar. 15, 2013

(65) Prior Publication Data
US 2014/0278019 A1 Sep. 18, 2014

(51) Int. Cl.
*F02D 29/02* (2006.01)
*F02N 11/08* (2006.01)
*F02D 41/22* (2006.01)

(52) U.S. Cl.
CPC ............ *F02D 29/02* (2013.01); *F02N 11/0818* (2013.01); *F02D 2041/228* (2013.01); *F02N 11/084* (2013.01); *Y02T 10/48* (2013.01)

(58) Field of Classification Search
CPC ............ F02N 11/0822; F02N 11/0814; F02N 11/0818; F02D 29/02
USPC ............ 123/179.3, 179.4; 701/112, 113, 102, 701/101
See application file for complete search history.

(56) References Cited

U.S. PATENT DOCUMENTS

| 3,936,955 | A | 2/1976 | Gruen et al. |
| 6,092,021 | A | 7/2000 | Ehlbeck |
| 6,117,007 | A | 9/2000 | Matsuyama et al. |
| 6,251,046 | B1 | 6/2001 | Yoshino et al. |
| 6,434,450 | B1 | 8/2002 | Griffin, Jr. et al. |
| 6,494,784 | B1 | 12/2002 | Matsuyama et al. |

(Continued)

FOREIGN PATENT DOCUMENTS

CN 101875334 A 11/2010

OTHER PUBLICATIONS

Non-Final Office Action dated Oct. 2, 2014 for U.S. Appl. No. 13/617,964.

(Continued)

*Primary Examiner* — Stephen K Cronin
*Assistant Examiner* — Xiao Mo
(74) *Attorney, Agent, or Firm* — David Kelley; Brooks Kushman P.C.

(57) ABSTRACT

Vehicles capable of operating in an energy conserving mode may include an interface for conveying inhibitors preventing activation of the energy conserving mode. The system may identify the inhibiting features and prompt an operator of the vehicle for authorization to disable the inhibiting features or adjust the feature states to enable the energy conserving mode. In response to receiving authorization, the system may automatically control feature interfaces to remove inhibits to the energy conserving mode. The interface may communicate active inhibitors to an operator using a display or a speaker, or both. Additionally, the interface may query the operator to approve automatic deactivation of the inhibiting features and facilitate the receipt of operator input to the query.

20 Claims, 4 Drawing Sheets

(56) References Cited

U.S. PATENT DOCUMENTS

| | | |
|---|---|---|
| 6,532,926 B1 | 3/2003 | Kuroda et al. |
| 6,760,655 B2 | 7/2004 | Matsubara et al. |
| 6,839,621 B2 | 1/2005 | Kaneko |
| 7,240,750 B2 | 7/2007 | Patel |
| 7,354,379 B2 | 4/2008 | Moriya |
| 7,603,228 B2 | 10/2009 | Coughlin |
| 7,698,053 B2 | 4/2010 | Mori |
| 8,120,478 B2 | 2/2012 | Skaff et al. |
| 2002/0107632 A1 | 8/2002 | Fuse et al. |
| 2002/0183917 A1* | 12/2002 | Wolf et al. .................. 701/112 |
| 2004/0122586 A1 | 6/2004 | Wolf et al. |
| 2007/0245997 A1* | 10/2007 | Levasseur et al. ......... 123/179.4 |
| 2007/0272187 A1* | 11/2007 | Celisse et al. ............. 123/179.4 |
| 2007/0288154 A1 | 12/2007 | Letang |
| 2008/0059035 A1 | 3/2008 | Siddiqui et al. |
| 2009/0234528 A1 | 9/2009 | Combez |
| 2009/0281715 A1 | 11/2009 | Paik |
| 2009/0319161 A1 | 12/2009 | Abendroth |
| 2010/0030414 A1 | 2/2010 | Watanabe et al. |
| 2010/0102945 A1 | 4/2010 | Watson et al. |
| 2010/0106352 A1 | 4/2010 | Skaff et al. |
| 2010/0305805 A1 | 12/2010 | Yamaguchi |
| 2011/0095878 A1* | 4/2011 | Skaff et al. .................... 340/441 |
| 2011/0190095 A1 | 8/2011 | Bollig et al. |
| 2011/0202216 A1 | 8/2011 | Thai-Tang et al. |
| 2011/0230309 A1 | 9/2011 | Albrecht |
| 2012/0077640 A1 | 3/2012 | Saito et al. |
| 2013/0245925 A1 | 9/2013 | Malone et al. |

OTHER PUBLICATIONS

Ecological Driver Assistant System by Honda, Japan Technology Information, pp. 1-6 (Nov. 25, 2008).

Honda Broadens Use of ECO Assist Function in Expanded Hybrid Car Line-Up With CR-Z and Jazz Hybrid, http://World.honda.com/HybridWorld/Index.html, pp. 1-3 (Mar. 24, 2011).

Non-Final Office Action for U.S. Appl. No. 13/617,964 dated Jul. 30, 2015.

* cited by examiner

SYSTEM AND METHOD FOR OPTIMIZING AVAILABILITY OF VEHICLE ENERGY CONSERVING MODES

TECHNICAL FIELD

The present application relates to a system and method for optimizing the availability of energy conserving modes in a vehicle.

BACKGROUND

Modern vehicle architectures allow for modes of operation designed to reduce energy consumption. These energy saving modes are often unable to be activated or used to their full potential due to usage of user-selectable features. Such features are often biased towards continuous operation or their own optimal performance, the consequence of which may result in the disabling of an energy conserving mode of vehicle operation. As a result, the fuel economy benefits of an energy conserving mode may be sacrificed despite an operator willingness to give up performance of these inhibiting features in order to extend operation in an energy conserving mode. Additionally, enabling and disabling an energy conserving mode in modern vehicle architectures is complex such that the causal relationship between feature controls and the functioning of an energy conserving mode may be unknown to typical drivers.

Hybrid technologies may be grouped into "full hybrid" and "micro-hybrid technologies." Full hybrid technologies may contain a hybrid propulsion system that utilizes at least two different sources of torque for propelling the vehicle. As one non-limiting example, a hybrid propulsion system may combine a conventional propulsion system that includes an internal combustion engine and a stepped-ratio change automatic transmission with an electric propulsion system that includes one or more electric motors and a rechargeable energy storage device, such as a battery, that can power the electric motors or store energy to improve fuel economy over the conventional vehicle. A hybrid electric vehicle (HEV) typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor, independent of the internal combustion engine.

Micro-hybrid technologies may contain Integrated Starter Generator (ISG) machines that are not capable of propelling the vehicle but are capable of supporting a rapid start of the engine as well as on/off operation of the engine while the vehicle is stationary. Thus, using micro-hybrid technologies, motor vehicles can be designed to employ certain aspects of HEV technology to reduce fuel consumption, but without use of a hybrid drivetrain. In such vehicles, sometimes called micro-hybrids, shutting down the engine during conditions where the engine operates at idle speed is used to reduce fuel consumption in a conventional powertrain that includes an internal combustion engine and a stepped-ratio change automatic transmission, but no electric machine for driving the wheels.

In conventional ISG based micro-hybrids, the ISG may be placed in series with the internal combustion engine and transmission system. The ISG takes the place of the traditional engine starter as well as the traditional alternator/generator that generates electric power for accessories and battery storage. The ISG may allow the engine to go from zero rpm to several hundred rpm in a fraction of a second, thus providing seamless start-stop capability to the driver in addition to increased fuel economy and reduced emissions.

The primary condition that is checked by a micro-hybrid powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine.

SUMMARY

One or more embodiments of the present disclosure are directed to a method for optimizing the availability of an auto-stop mode in vehicles equipped with an automatic start-stop system. The method may include receiving input indicating vehicle propulsion conditions for auto-stopping an engine are satisfied and one or more auto-stop inhibitors are present preventing the engine from auto-stopping. The input may further indicate that all of the auto-stop inhibitors relate to operator-controllable features. The method may further include outputting at least one message identifying the auto-stop inhibitors via a user interface. The message may include a prompt for authorization to automatically remove the auto-stop inhibitors. The method may further include receiving input indicative of authorization to automatically remove the auto-stop inhibitors in response to the message prompt. Accordingly, the auto-stop inhibitors may be removed to enable an auto-stop even to occur by automatically controlling the operator-controllable features without receiving additional operator input.

Removing the auto-stop inhibitors may include automatically deactivating the related operator-controllable features. Alternatively, removing the auto-stop inhibitors may include automatically adjusting the related operator-controllable features to a level sufficient to enable the engine to auto-stop. Moreover, the operator-controllable features may return to their original state at the conclusion of the auto-stop event. The method may further include saving the authorization to automatically remove the auto-stop inhibitors for recall during a subsequent auto-stopping event.

One or more additional embodiments of the present disclosure are directed to a method for optimizing the availability of an energy conserving mode in a vehicle. The method may include receiving input indicating propulsion conditions for operating a vehicle in an energy conserving mode are satisfied and at least one inhibitor is present preventing the energy conserving mode. The method may further include obtaining authorization to automatically remove the inhibitor to enable the vehicle to operate in the energy conserving mode.

The at least one inhibitor may be associated with an operator-controllable feature. Obtaining authorization to automatically remove the inhibitor may include outputting a message identifying the inhibitor and prompting for authorization to automatically remove the inhibitor and receiving input indicative of authorization to automatically remove the inhibitor in response to the message prompt. The method may further include saving the authorization to automatically remove the inhibitor to a memory device for recall when propulsion conditions for operating the vehicle in the energy conserving mode are subsequently met.

Alternatively, obtaining authorization to automatically remove the inhibitor may include recalling the authorization from a memory device. The authorization may have been previously received during a prior energy conserving mode opportunity in response to a message identifying the inhibitor and prompting for authorization to automatically remove the inhibitor. Further, the method may include displaying a settings menu during a configuration sequence of energy conserving mode settings and receiving input indicative of the authorization to automatically remove the inhibitor during the configuration sequence of the energy conserving mode settings. The authorization may be recalled from the energy conserving mode settings. The energy conserving mode settings may indicate authorization to disable the inhibitor when propulsion conditions for operating the vehicle in the energy conserving mode are satisfied. Moreover, the energy conserving mode settings may indicate authorization to automatically adjust the associated operator-controllable feature to a pre-set level selected by an operator.

The method may include removing the at least one inhibitor by automatically controlling the associated operator-controllable features without receiving additional operator input. Removing the at least one inhibitor may include automatically deactivating the associated operator-controllable features. Alternatively, removing the at least one inhibitor may include automatically adjusting the associated operator-controllable features to a level sufficient to enable the energy conserving mode.

One or more additional embodiments of the present application are directed to a control system including a controller configured to receive input indicative of vehicle propulsion conditions and a presence of at least one inhibitor associated with an operator-controllable feature. The control system may further include an interface, in communication with the controller, configured to output a message identifying the inhibitor and prompting for operator authorization to automatically remove the inhibitor.

The controller may be configured to receive input indicative of authorization to automatically remove the at least one inhibitor and automatically controlling the associated operator-controllable features without receiving additional operator input to remove the at least one inhibitor in response to the authorization. Removing the at least one inhibitor may include automatically deactivating the associated operator-controllable features or adjusting the associated operator-controllable features to a level sufficient to enable the energy conserving mode.

BRIEF DESCRIPTION OF THE DRAWINGS

FIGS. 2a-e depict exemplary views of a user interface display in accordance with one or more embodiments of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
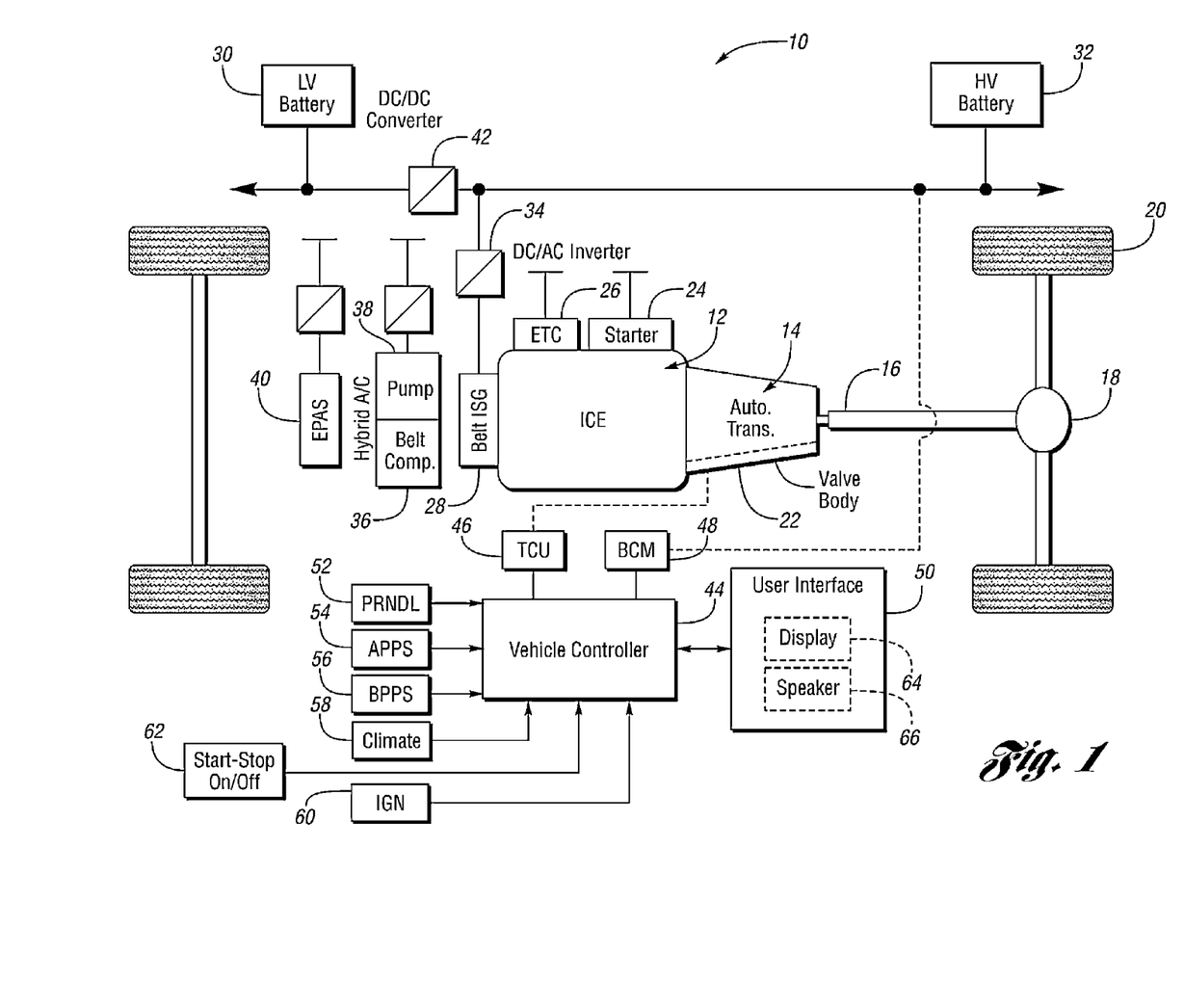
FIG. 1 is a simplified, exemplary schematic representation of a vehicle including an automatic start-stop system and a user interface in accordance with one or more embodiments of the present application.

FIG. 1 schematically illustrates a vehicle 10 including an internal combustion engine 12 and an automatic transmission 14. Torque delivered from a crankshaft of the internal combustion engine 12 is delivered through multiple-ratio gearing of the transmission 14 to a driveshaft 16 and to a final drive differential-and-axle assembly 18 for traction wheels 20. The gearing for the transmission 14 may establish multiple torque ratios under the control of a valve body 22. The ratios may be established by engageable and disengageable clutches and brakes in a conventional fashion. The transmission 14 may be configured for a neutral state by disengaging a forward drive clutch. A starter motor 24 under the control of a low-voltage battery (not shown) can be used to start the engine 12 under cold start conditions. The vehicle 10 may also include an electronic throttle control 26 for the engine 12. Even though vehicle 10 is depicted with an automatic transmission, one or more embodiments of the present application may also be employed in vehicles having manual transmissions.

In addition, vehicle 10 may include an automatic start-stop system that automatically shuts down and restarts the engine 12 to reduce the amount of time the engine spends idling, thereby reducing fuel consumption and emissions. Automatically shutting down the engine can be most advantageous for vehicles which spend significant amounts of time waiting at traffic lights or frequently come to a stop in traffic jams. While the automatic start-stop feature is present in HEVs, automatic start-stop systems may also appear in vehicles that lack a hybrid electric powertrain, such as vehicle 10. The vehicle 10 may enter an auto-stop mode (i.e., the engine is auto-stopped) when certain vehicle propulsion conditions are met, such as when the driver has applied the brakes and the vehicle speed is below a predetermined speed threshold. Once the driver indicates a request for vehicle propulsion (e.g., by releasing the brake pedal), a powertrain controller may automatically restart the engine 12.

To this end, the engine 12 may be drivably connected to a crankshaft pulley, which drives a belt-driven integrated starter-generator 28 in one or more embodiments of the present application. Although a belt-drive is disclosed, other types of drives could be used to provide a driving connection between the engine 12 and the starter-generator 28. For example, a flexible chain drive or a geared drive could be used, depending on design choice. The starter-generator 28 may be electrically coupled to a voltage source, such as a low-voltage battery 30 or a high-voltage battery 32. The high-voltage battery 32 may be connected to the starter-generator 28 through a DC/AC inverter 34.

Since automobile accessories like air conditioners and water pumps have typically been designed to run off a serpentine belt on an engine, those systems need to be redesigned to function properly when the engine is turned off. In full HEVs, an electric motor is typically used to power these devices instead. In vehicle 10, hybrid vehicle accessories, such as an air conditioning compressor 36, a fuel pump 38 and a power steering pump 40, may be electrically powered by low-voltage battery 30. The voltage sources may be separated by a DC/DC converter 42, which may adjust, or "step down" the voltage level to allow the high-voltage battery 32 to charge the low-voltage battery 30.

A vehicle control system, shown generally as a vehicle controller 44, may be provided to control various components and subsystems of the vehicle 10, including the automatic start-stop system. The vehicle controller 44 may be a general vehicle controller, such as a vehicle system controller (VSC). Although it is shown as a single controller, the vehicle controller 44 may include multiple controllers or may include multiple software components or modules embedded in a single controller to control various vehicle systems, sub-systems and components. For instance, the vehicle controller 44 may include the powertrain controller to control various aspects of the micro-hybrid powertrain. The powertrain controller could be a separate hardware device, or may include a separate powertrain control module (PCM), which could be software embedded within a general purpose controller, such as the VSC. The vehicle controller 44 may generally include any number of microprocessors, ASICs, ICs, memory (e.g., FLASH, ROM, RAM, EPROM and/or EEPROM) and software code to co-act with one another to perform a series of operations.

The vehicle controller 44 may communicate with other controllers over a vehicle-wide network, such as a controller area network (CAN). The CAN may be a hardline vehicle connection (e.g., bus) and may be implemented using any number of communication protocols. For example, the vehicle controller 44 may communicate with a transmission control unit (TCU) 46 and a battery control module (BCM) 48, which is electrically coupled to the high-voltage battery 32. Alternatively, the aforementioned controllers may be software control modules contained within the vehicle controller 44 or other general purpose controllers residing on the vehicle. Some or all of these various controllers or software control modules can make up a control system in accordance with the present application. It will be appreciated, however, that various aspects of the disclosed subject matter are not limited to any particular type or configuration of the vehicle controller 44, or to any specific control logic for managing operation of the micro-hybrid powertrain or other vehicle systems.

The vehicle controller 44 may communicate with each individual vehicle system to monitor and control vehicle operation according to programmed algorithms and control logic. In this regard, the vehicle controller 44 may help manage the different energy sources available and the engine status in order to optimize fuel economy and/or maximize the vehicle's range. The vehicle controller 44 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas, or manual inputs, such as those described above. The vehicle controller 44 may process these input signals and others according to logic rules to monitor and control operation of the micro-hybrid powertrain.

In addition to the foregoing, the vehicle 10 may include a user interface 50 to facilitate communications with a driver. The user interface may communicate with the vehicle controller 44 and may provide relevant vehicle content to the driver. The vehicle controller 44 may be configured to receive input signals that are indicative of current operating and/or environmental conditions of the vehicle 10, including signals relevant to the operation of the automatic start-stop system. For instance, the vehicle controller 44 may receive input signals from the TCU 46 and the BCM 48, as well as a gear selector (PRNDL) 52, an accelerator pedal position sensor (APPS) 54, a brake pedal position sensor (BPPS) 56, a climate control module 58, an ignition switch (IGN) 60, and an automatic start-stop switch 62, or the like. The automatic start-stop switch 62 can allow the driver to manually deactivate the automatic start-stop system, thereby preventing engine auto-stops at the driver's request. The vehicle controller 44 may provide output to the user interface 50 such that the user interface 50 conveys vehicle operating information, such as information relating to the operation of the automatic start-stop system, to the driver. As will be described below, the user interface 50 may communicate relevant vehicle information to a driver visually through a display 64 and/or audibly via a speaker 66.

The display 64 may be electrically connected to a display controller (not shown). The display controller may communicate with the powertrain controller, the TCU 46, the BCM 48, and other dedicated or general purpose controllers, such as the vehicle controller 44. The display controller may gather data from various vehicle systems and components, which may be accessed via the CAN. Moreover, the display controller may provide data to the display 64 for conveying vehicle operation information to the driver in a meaningful manner. Signals output from the various vehicle systems and components may be processed, and display computations may be carried out, in the vehicle controller 44, the display controller or the display 64, or some combination thereof. The display controller may be a separate controller or may be integrated with the vehicle controller 44 or another general or dedicated vehicle controller. Thus, as with the powertrain controller, all monitoring, processing and control operations that may be performed by a separate display controller may be described herein as being carried out by the vehicle controller 44.

Figure 2A:
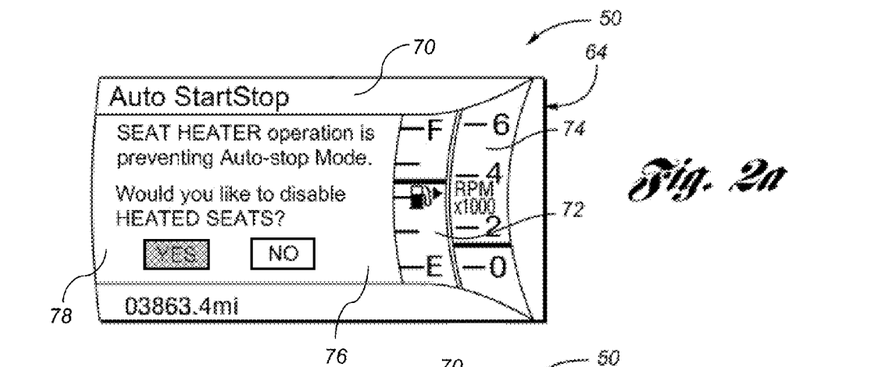
Figure 2B:
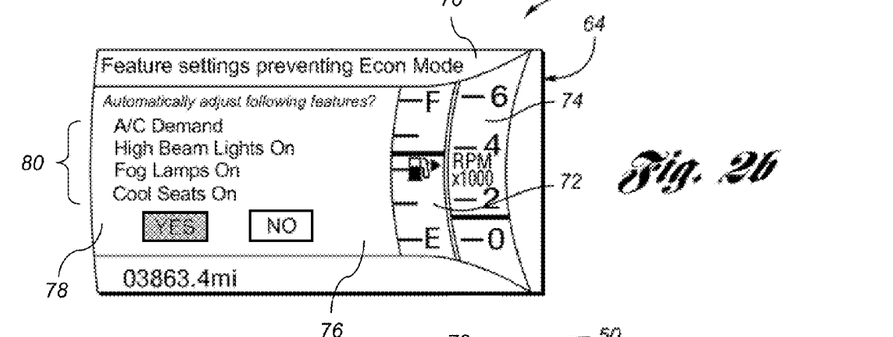
Figure 2C:
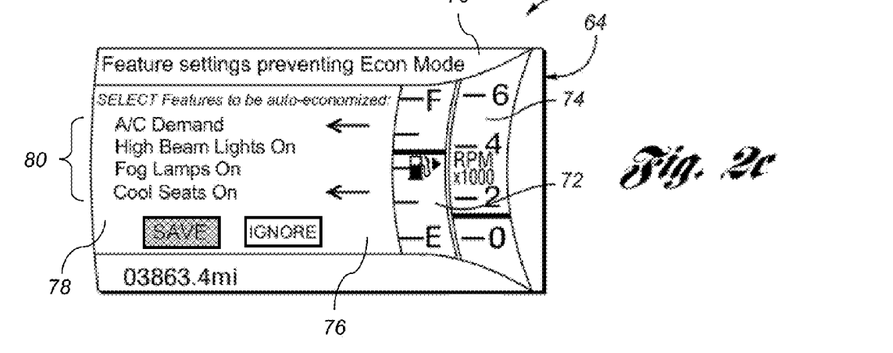

Referring generally to FIGS. 2*a-c*, the user interface 50 is shown in greater detail in accordance with one or more embodiments of the present application. As seen therein, the user interface 50 may include at least one display 64 and associated circuitry, including hardware and/or software, necessary to communicate with the vehicle controller 44 and operate the display 64. The display 64 may convey a host of information about the vehicle and its surroundings using graphical, schematic, numerical, textual and/or iconic representations or images. The display 64 may be generally used to convey relevant vehicle content to a driver of the vehicle 10 including, for example, information relating to the operation of the vehicle 10 and/or the status of the automatic stop-start system.

The display 64 may be disposed within a dashboard (not shown) of the vehicle 10, such as in an instrument panel or center console area. Moreover, the display 64 may be part of another user interface system, such as a navigation system, or may be part of a dedicated information display system or message center. The display 64 may be a liquid crystal display (LCD), a plasma display, an organic light emitting display (OLED), or any other suitable display. The display 64 may include a touch screen for receiving driver input associated with selected areas of the display 64. The user interface or display may also include one or more buttons (not shown), such as hard keys or soft keys, for receiving driver input. Other operator inputs known to one of ordinary skill in the art may also be employed without departing from the scope of the present application.

One or more embodiments of the present application may be implemented using the user interface 50. The vehicle controller 44 may regularly receive vehicle data, including operational and environmental data, from communicatively connected devices, such as those described above. Moreover, the data may be processed into one or more representations that may be displayed on the display 64, including information that may encourage efficient driving behavior or other economical vehicle operating choices. For instance, the display 64 may convey the presence of vehicle features preventing the vehicle 10 from operating in an energy conserving mode. Further, the user interface 50 may prompt or query drivers to select one or more features to disable or adjust in order to enable an energy conserving mode.

The display 64 may include an energy conserving mode display screen 70. The energy conserving mode display screen 70 may be one of several display screens for displaying relevant vehicle content to a driver on demand. For example, a driver may select the energy conserving mode display screen 70 from a menu of various information display screens. Upon selection, the energy conserving mode display screen 70 may be displayed on the display 64. The energy conserving mode display screen 70 may include one or more gauges common to several information display screens. For example, the display 64 may include a fuel gauge 72, a tachometer 74, or the like that is displayed on the energy conserving mode display screen 70 as well as other selectable information display screens. Further, the energy conserving mode display screen 70 may include a message region 76 for displaying messages 78 concerning the operation of an energy conserving mode.

Although illustrated and described in the context of the vehicle 10, which is a micro-hybrid vehicle, it is understood that embodiments of the present application may be implemented on other types of vehicles having different powertrain topologies capable of operating in an energy conserving mode. Some examples include full hybrid electric vehicles, plug-in electric vehicles, and vehicles with conventional powertrains powered by an internal combustion engine alone. For instance, full HEVs may include energy conserving modes that allow an idling engine to be turned off, similar to micro-hybrids, as well as an electric vehicle (EV) mode in which an electric motor alone is used for vehicle propulsion. Energy conserving modes on vehicles equipped with conventional powertrains may involve engine features such as variable displacement, lowered RPM idle control, or the like. Thus, as used herein, an energy conserving mode may generally refer to any vehicle operating mode intended to reduce energy consumption for the purposes of increasing fuel economy, increasing vehicle range, reducing emissions, or the like, including any combination thereof.

An energy conserving mode on a vehicle equipped with automatic start-stop system, such as vehicle 10, may include the aforementioned auto-stop mode. Such a vehicle often includes many electrical loads and other vehicle subsystems that may prevent the vehicle from entering the auto-stop mode or, while in the auto-stop mode, may require the engine 12 to restart sooner than anticipated. As used herein, items, events or conditions that prevent the vehicle 10 from entering the auto-stop mode may be referred to as auto-stop inhibitors. Items, events or conditions that cause the engine 12 to restart may be referred to herein as restart requestors. Restart requestors may be driver-induced or system-induced. Driver-induced restart requestors may refer to events in which the driver requests engine power directly in order to propel the vehicle 10. On the other hand, system-induced restart requestors may refer to items, events or conditions that cause the engine 12 to restart sooner than expected (e.g., before a driver request for vehicle propulsion). System-induced restarts may be indirectly influenced by driver actions. For reference purposes, auto-stop inhibitors and system-induced restart requestors may be collectively referred to herein simply as inhibitors.

There can be several reasons why inhibitors prevent the vehicle 10 from entering or remaining in the auto-stop mode, such as maintaining minimum battery energy sufficient to auto-start the engine 12 or keeping the battery state of charge (SOC) and state of health (SOH) at robust levels for proper maintenance and longevity. Thus, when the cumulative effect of vehicle electrical loads becomes excessive or exceeds an electrical load threshold, an engine auto-stop may be prevented or discontinued. Examples of electrical loads that may impact the status of the automatic start-stop system may include auxiliary lighting, window defrost, wipers, climate control, heated (or cooled) seats, heated steering wheel, auxiliary power (e.g., plugged-in device), and the like. Certain electrical loads may have a greater impact on the status of the automatic start-stop system than others. Moreover, certain electrical loads, when introduced, may be independently sufficient to inhibit the auto-stop mode on their own. Additionally, certain vehicle operating modes or states may prevent the engine from auto-stopping. For example, four-wheel drive, trailer towing, automatic curb-side parking, various other vehicle maneuvering modes, and the like may inhibit an auto-stop. Auto-stops may also be inhibited due to gear selection, or because a vehicle door is ajar or the driver's seat belt is unlatched. Furthermore, certain environmental conditions may also preclude auto-stopping, such as the outside ambient temperature or the engine temperature. Finally, the automatic start-stop system may be manually deactivated by the driver via the automatic start-stop switch preventing engine auto-stops at the driver's request.

Vehicle drivers may be unaware of the impact of the aforementioned electrical loads and/or vehicle operating modes on the automatic start-stop system. Indeed, drivers may operate electrical loads at higher power demands (e.g., wipers ON vs. intermittent, max A/C cooling, etc.) or forget they are even on. However, the presence of these inhibitors can lead to reduced fuel economy and increased emissions.

According to one or more embodiments of the present application, the user interface 50 may be used to convey information concerning the operation and status of an energy conserving mode, such as the auto-stop mode on a vehicle equipped with an automatic start-stop system. This information may be communicated in the form of on-demand messages, pop-up alerts, tell-tales, or the like. In particular, the user interface 50 may communicate messages indicating what is preventing the engine 12 from auto-stopping or what has caused the engine 12 to restart during an auto-stop event. The user interface 50 may communicate these inhibitors visually or audibly.

For instance, the display 64 may convey the presence of vehicle features preventing the vehicle 10 from operating in the auto-stop mode. Further, the user interface 50 may prompt or query drivers to select one or more features to disable or adjust in order to enable the auto-stop mode. Of course, enabling the auto-stop mode assumes all other vehicle propulsion conditions for an auto-stop event are met and that no other inhibits in which the driver lacks the ability to control are present.

While inhibitors have been described in the context of an automatic start-stop system, inhibitors may generally refer to any feature state, either alone or in combination with other features states, preventing an energy conserving mode. One or more embodiments of the present application may provide a driver a convenient way to directly or indirectly disable these features and allow the vehicle 10 to operate in an energy conserving mode.

The control system may utilize knowledge of optimization of the vehicle states and activated user-controllable features, which, when active, disable the energy conserving mode. The control system may examine the active features, vehicle state and related settings for items that may be restricting operation in an energy conserving mode. Accordingly, the vehicle controller 44 may select which feature states are offered for query via the user interface 50, thereby allowing an operator to indicate a preference for optimal fuel economy (e.g., via automatic start-stop, EV mode, etc.). When the operator selection indicates a preference for fuel economy, the control system may deactivate the mode disabling features automatically without operator need to manipulate the feature interface(s).

According to one or more embodiments of the present application, an operator may select overrides based on a response to immediate query. Moreover, the control system may repeat queries each time vehicle conditions for operating in an energy conserving mode are satisfied but for the presence of a driver controllable inhibit. For instance, each time vehicle propulsion conditions for an auto-stop are met (e.g., each time the vehicle 10 comes to rest), but one or more feature states are otherwise preventing the engine 12 from shutting off, the interface 50 may prompt an operator to select whether to enable the auto-stop mode by automatically disabling or at least adjusting the features preventing an auto-stop. An operator response to the query may be made optional, but available, so as not to distract the operator when otherwise attentive elsewhere.

FIG. 2a illustrates an exemplary display screen 70 for prompting a vehicle operator in the aforementioned manner. In the example, heated seats may be activated while operating a vehicle equipped with an automatic start-stop system, such as vehicle 10. The heated seats may normally be biased to provide maximum heating. Consequently, the auto-stop mode may not be enabled when the vehicle 10 stops. The operator may receive a query requesting approval to deactivate the heated seats while the vehicle is stopped. As shown in FIG. 2a, the query may be conveyed as a message 78 via the display 64. If the operator signals approval, heated seats may be deactivated by the control system without further operator effort and the auto-stop mode may be enabled permitting the engine 12 to shut down.

Additionally, the vehicle controller 44 may perform overrides based on prior saved responses from operator queries. The control system may recall a previous response to the query for each subsequent decision. Thus, rather than query the operator each time vehicle propulsion conditions for an auto-stop are met, the vehicle controller 44 may query the operator at other intervals. For instance, the control system may prompt the operator to select whether to disable certain features preventing the auto-stop mode once per trip (e.g., once per ignition cycle), once per some predetermined time or distance interval, or the like. Accordingly, similar to the previous example, the operator may receive a query requesting approval to deactivate the heated seats whenever the vehicle is stopped. If the operator signals approval, heated seats may be automatically deactivated by the control system without further operator effort. Moreover, the mode of operation for the heated seats feature may be retained for subsequent vehicle stops or until the operator decides to change it.

At the conclusion of the auto-stop event, the control system may return the disabled or adjusted feature to its previous state or level. Alternatively, in one or more embodiments, the control system may maintain the feature state at the adjusted level even after the auto-stop event concludes. Further, the control system may permit the operator to indicate a preference to return inhibiting features to a prior state/level or keep them at an adjusted state/level when an auto-stop event is completed. The operator may be prompted to indicate this preference on the fly or may do so in a settings menu.

Referring now to FIGS. 2b and 2c, a list 80 of the activated features preventing an energy conserving mode may be communicated to the operator via the user interface 50, in accordance with one or more alternate embodiments of the present application. As shown in FIG. 2b, the list 80 may present all of the currently activated features and prompt for approval to automatically economize each feature to enable operation of the energy conserving mode. Alternatively, as shown in FIG. 2c, the list may present one or more activated features with an option for the operator to select individual features from the list to be automatically economized. Accordingly, operator responses may consist of individual responses to each item in the list 80, which may then be accepted or otherwise saved as shown in FIG. 2c, or may consist of a single response indicating approval (or disproval) to disable or adjust each item in the list collectively, as shown in FIG. 2b. Thus, if more than one feature is inhibiting an energy conserving mode, the user interface 50 may prompt the operator to choose whether to disable or adjust the inhibiting features collectively (FIG. 2b). Alternatively, the user interface 50 may prompt the operator to select whether to disable or adjust each active inhibiting feature individually (FIG. 2c).

The vehicle controller 44 may recommend and/or prioritize the active features inhibiting an energy conserving mode. To this end, the vehicle controller 44 may sort the list 80 of inhibiting features or otherwise highlight the desirability of targeting one or more active features for the operator's consideration for deactivation. The inhibiting features include those that the operator can control and, therefore, has the ability to designate for deactivation if vehicle conditions allow. Further, the inhibiting features may include those not required to support safety, vehicle integrity, or the like. Some of these optional features designate-able by the operator may include devices utilizing the vehicle's power invertor, windshield wipers, heated/cooled seats, window defrost, trailer tow, air conditioning, heating, high beams, fog lights, speaker volume, ambient lighting effects, and the like.

According to one or more additional embodiments, operators may elect in advance to have one or more features inhibiting an energy conservation mode automatically disabled or adjusted. An operator's preferences may be selected and saved similar to other vehicle settings. As shown in FIGS. 2d-e, the operator may create personal settings regarding an energy conserving mode via the user interface 50, in particular the display 64. For example, an operator may navigate a menu system to set personal preferences regarding feature deactivation for optimizing the availability of an energy conserving mode.

FIG. 2d depicts an exemplary display screen 82 of a settings menu for creating personal settings. The display 64 may convey a number of features with an option for the operator to select from the list the individual features that can be automatically economized by the control system to optimize energy conserving mode operation. For instance, an operator may choose to permit the control system to automatically deactivate seat coolers when the vehicle is stopped in order to enable an auto-stop to occur.

FIG. 2e depicts another exemplary display screen 84 of a settings menu for creating personal settings. The display 64 may convey a number of features with an option for the operator to select from the list individual features that may be automatically adjusted. Moreover, the display 64 may include graphical representations of tuning elements 86 adjacent each listed feature allowing the operator to tune the level of optimization. The operator may manipulate the user interface input selectors or buttons to adjust the level of optimization conveyed by the tuning elements 86. Accordingly, an operator can indicate a level of optimization for a feature beyond what is necessary to remove the inhibit in order to spend more time in an energy conserving mode. For example, an operator may adjust the air conditioning load setting to a level that is below the maximum A/C load at which an auto-stop can still occur. By optimizing the accepted A/C load level during engine idling events, more auto-stops may result. Further, changes in the optimization level of one feature may impact the permissible state or level of another feature without preventing an auto-stop. For instance, by setting the A/C load relatively low, the fog lamps may be able to remain on during an auto-stop, whereas it might otherwise be necessary to disable the fog lamps during an auto-stop under default settings. Of course, the operator may still elect to disable the fog lamps during an auto-stop. The tuning elements 86 may be dynamically interrelated. In this regard, as certain feature states are tuned by an operator, the tuning elements 86 associated with other features may be correspondingly adjusted to reflect the impact.

In one or more alternative embodiments, the operator may use the use the tunable feature setting to determine the permitted level of optimization. For example, an operator may be willing to sacrifice a certain amount of air conditioning demand to enable an energy conserving mode. However, the vehicle controller 44 may not adjust the air conditioning beyond the level set by the operator even if it prevents the energy conserving mode from activating. Likewise, if the current fan setting is relatively high, the controller may need to reduce the fan speed to enable an energy conserving mode. The vehicle controller 44 may lower fan speed by only the amount necessary. However, if the necessary reduction in fan speed would lower it beyond a threshold set by the operator, then the vehicle controller 44 may limit the adjustment to the operator-defined threshold.

The settings may be personal to the vehicle 10 such that the vehicle may operate according to the saved preferences regardless of the operator. Additional, the settings may be personal to an operator. Accordingly, different operators of a vehicle may save their own specific energy conserving mode preferences similar to personal preference settings for seat and mirror positioning. An operator's setting may be recalled by the operator through a selection from the menu system via the user interface 50. Alternatively, specific operator settings may be recalled automatically via operator identification in a manner known to one of skill in the art (e.g., RFID exchange via key fob).

According to one or more embodiments, if energy conserving mode settings for a first operator have been established, but a second operator is driving the vehicle, the user interface 50 may inform the second operator that a change in one or more feature states may be forthcoming in order to enable an energy conserving mode, such as an auto-stop mode. The user interface 50 may also prompt the second operator to accept the change in feature states actively or passively. For instance, the system may function according to the first operator's settings upon receiving an affirmative input from the second operator via the user interface 50. Alternatively, the system may inform the second operator that one or more feature states may be modified according to the first operator's settings, unless the second operator indicates otherwise. Accordingly, the user interface 50 may only prompt the second operator to reject the change to one or more features states. If no such input indicating a rejection is received after a period of time has elapsed, the system may function according to the first operator's settings.

Figure 3:
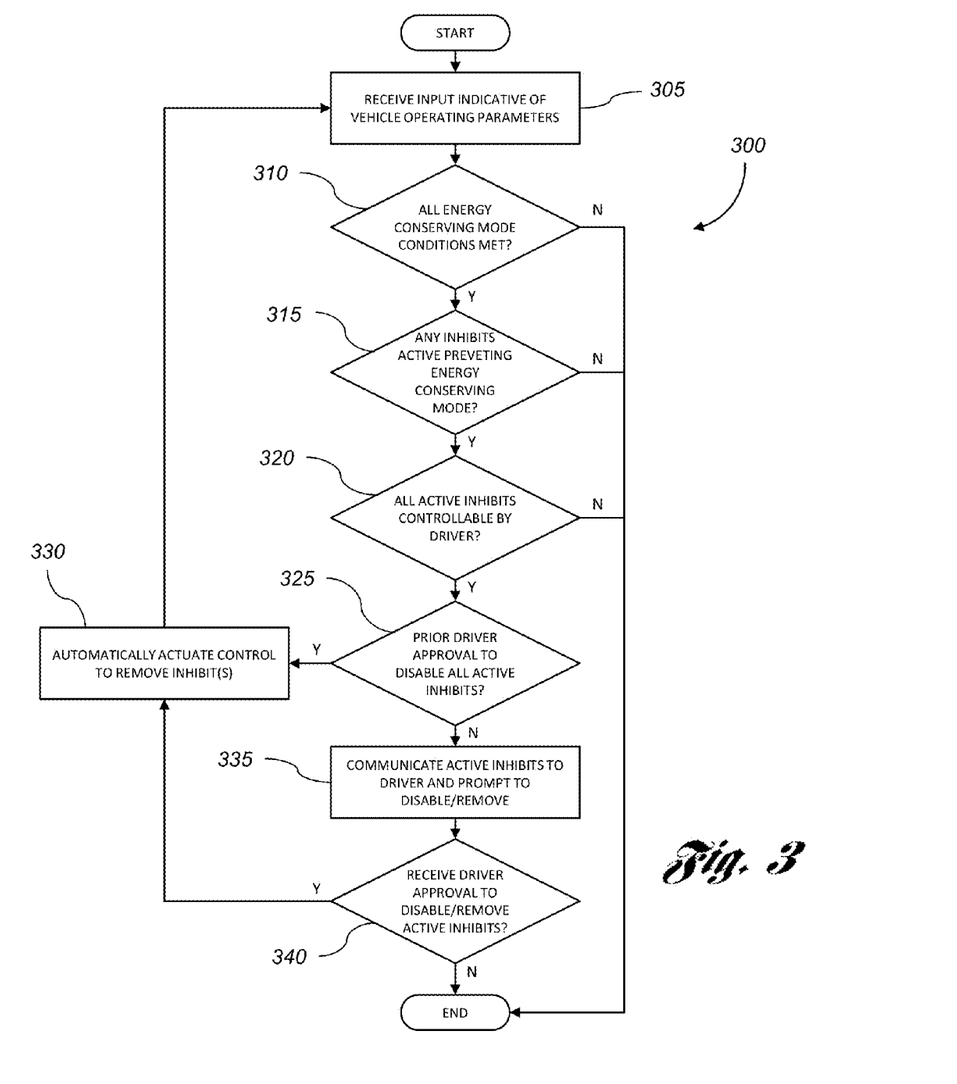
FIG. 3 is a simplified, exemplary flow diagram depicting a method for conveying energy conserving mode availability information via the user interface in accordance with one or more embodiments of the present application.

FIG. 3 is a simplified, exemplary flow diagram illustrating a method for controlling the energy conserving mode optimization information communicated by the user interface 50, in accordance with one or more embodiments of the present application. At step 305, the controller 44 may receive input signals indicative of a number of vehicle operating parameters, including operating and/or environmental conditions. Based on the input signals, the controller 44 may determine whether all vehicle conditions for operating in an energy conserving mode are satisfied, as provided at step 310. For instance, in a vehicle equipped with an automatic start-stop system, the controller 44 may determine whether all vehicle propulsion conditions for an auto-stop are met. If not, the process may terminate or return to step 305. However, if all energy conserving mode conditions have been met, the method may proceed to step 315.

At step 315, the controller 44 may determine whether any inhibits are active that may otherwise prevent the vehicle from operating in the energy conserving mode. If there are no active inhibits preventing the energy conserving mode, the process may terminate or return to step 305. If, however, inhibiting features preventing the energy conserving mode are active, the method may proceed to step 320. At step 320, the controller 44 may determine whether all the active inhibiting features are ones that a vehicle operator can control so as not to interfere with vehicle safety or integrity. If one or more active inhibits are out of the operator's control, the process may terminate or return to a prior step. On the other hand, if all the inhibiting features are driver controllable, the method may proceed to step 325.

At step 325, the controller 44 may determine whether it received prior input indicative of driver approval to automatically disable or adjust all inhibiting features when they prevent the vehicle from operating in an energy conserving mode. As previously discussed, the controller 44 may receive input indicative of approval to disable inhibits via the user interface 50. Moreover, the prior approval may be recalled from vehicle or operator preference settings or may be temporarily saved from an earlier execution of the method 300. If, at step 325, the controller received prior approval to disable all active inhibits, the method may proceed to step 330. At step 330, the controller 44 may automatically actuate control of the relevant feature interfaces to remove the inhibiting feature states without operator effort. On the other hand, if at step 325 it is determined that no prior approval to disable all the active inhibits was received from the operator, the method may proceed to step 335.

At step 335, the controller 44 may communicate the active inhibits to the user interface 50 for display. Accordingly, the display 64 may convey the presence of inhibiting features preventing an energy conserving operating mode. The display may further prompt the operator to select whether to disable or otherwise adjust the inhibiting feature(s), for example, as illustrated in FIGS. 2*a-c*. At step 340, the controller 44 may determine whether operator input indicative of approval to disable the active inhibits was received. If no approval was received, the process may terminate or return to a prior step. If, however, the controller received input indicative of operator approval to disable the features inhibiting the energy conserving mode, the method may proceed to step 330. At step 330, the controller 44 may automatically actuate control of the relevant feature interfaces to remove the inhibiting feature states without further operator effort, as set forth above. Thereafter, the method may return to step 305 until the vehicle conditions for operating in an energy conserving mode are no longer present.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    receiving, at a controller, input indicating vehicle propulsion conditions for auto-stopping an engine are satisfied;
    receiving, at the controller, input indicating one or more auto-stop inhibitors are present preventing the engine from auto-stopping when an automatic start-stop system is enabled by an automatic start-stop switch, the input further indicating that all of the auto-stop inhibitors relate to operator-controllable features;
    outputting at least one message identifying the auto-stop inhibitors via a user interface, the message including a prompt for authorization to automatically remove the auto-stop inhibitors;
    receiving, at the user interface, input indicative of authorization to automatically remove the auto-stop inhibitors in response to the message prompt; and
    automatically controlling the operator-controllable features to remove the auto-stop inhibitors and enable an auto-stop event to occur.

2. The method of claim 1, wherein removing the auto-stop inhibitors includes automatically deactivating the related operator-controllable features.

3. The method of claim 1, wherein removing the auto-stop inhibitors includes automatically adjusting the related operator-controllable features to a level sufficient to enable the engine to auto-stop.

4. The method of claim 1, wherein the operator-controllable features return to their original state at the conclusion of the auto-stop event.

5. The method of claim 1, further comprising:
    saving the authorization to automatically remove the auto-stop inhibitors for recall during a subsequent auto-stopping event.

6. A method comprising:
    receiving, at a controller, input indicating propulsion conditions for operating a vehicle in an energy-conserving mode are satisfied and at least one inhibitor is present preventing the energy-conserving mode when an automatic start-stop system is enabled;
    receiving, at the controller, authorization to automatically remove the inhibitor to enable the vehicle to operate in the energy-conserving mode; and
    automatically controlling, via the controller, conditions to remove the inhibitor and enable the energy-conserving mode responsive to the authorization.

7. The method of claim 6, wherein the at least one inhibitor is associated with an operator-controllable feature.

8. The method of claim 7, wherein receiving authorization to automatically remove the inhibitor comprises:
    outputting a message identifying the inhibitor and prompting for authorization to automatically remove the inhibitor; and
    receiving input indicative of authorization to automatically remove the inhibitor in response to the message prompt.

9. The method of claim 8, further comprising:
    saving the authorization to automatically remove the inhibitor to a memory device for recall when propulsion conditions for operating the vehicle in the energy-conserving mode are subsequently met.

10. The method of claim 7, wherein receiving authorization to automatically remove the inhibitor comprises:
    recalling the authorization from a memory device.

11. The method of claim 10, wherein the authorization was previously received during a prior energy-conserving mode opportunity in response to a message identifying the inhibitor and prompting for authorization to automatically remove the inhibitor.

12. The method of claim 10, further comprising:
    displaying a settings menu during a configuration sequence of energy-conserving mode settings; and
    receiving input indicative of the authorization to automatically remove the inhibitor during the configuration sequence of the energy-conserving mode settings;
    wherein the authorization is recalled from the energy-conserving mode settings.

13. The method of claim 12, wherein the energy-conserving mode settings indicate authorization to disable the inhibitor when propulsion conditions for operating the vehicle in the energy-conserving mode are satisfied.

14. The method of claim 12, wherein the energy-conserving mode settings indicate authorization to automatically adjust the associated operator-controllable feature to a pre-set level selected by an operator.

15. The method of claim 7, wherein automatically controlling, via the controller, vehicle features to remove the inhibitor and enable the energy-conserving mode responsive to the authorization comprises:
    automatically controlling, via the controller, the associated operator-controllable features to remove the at least one inhibitor and enable the energy-conserving mode responsive to the authorization.

16. The method of claim 15, wherein controlling the associated operator-controllable features includes automatically deactivating the associated operator-controllable features.

17. The method of claim 15, wherein controlling the associated operator-controllable features includes automatically adjusting the associated operator-controllable features to a level sufficient to enable the energy-conserving mode.

18. A control system comprising:
    a controller configured to receive input indicative of vehicle propulsion conditions and a presence of at least one inhibitor associated with an operator-controllable feature preventing activation of an energy-conserving mode when an automatic start-stop system is enabled; and
    an interface, in communication with the controller, configured to output a message identifying the inhibitor and prompting for operator authorization to automatically remove the inhibitor.

19. The control system of claim 18, wherein the controller is further configured to receive input indicative of authorization to automatically remove the at least one inhibitor and control the associated operator-controllable features to remove the at least one inhibitor in response to the authorization.

20. The control system of claim 19, wherein controlling the associated operator-controllable features to remove the at least one inhibitor includes automatically deactivating the associated operator-controllable features or adjusting the associated operator-controllable features to a level sufficient to enable the energy-conserving mode.

* * * * *